(12) United States Patent
Timmons (10) Patent No.: US 7,442,248 B2
(45) Date of Patent: Oct. 28, 2008

(54) CEMENTITIOUS COMPOSITION

(75) Inventor: Scott F. Timmons, San Antonio, TX (US)

(73) Assignee: Research Incubator, Ltd., Corpus Christi, TX (US)

( * ) Notice: Subject to any disclaimer, the term of this patent is extended or adjusted under 35 U.S.C. 154(b) by 636 days.

(21) Appl. No.: 11/186,965

(22) Filed: Jul. 21, 2005

(65) Prior Publication Data

US 2005/0252420 A1    Nov. 17, 2005

Related U.S. Application Data

(63) Continuation-in-part of application No. 10/716,241, filed on Nov. 18, 2003, now abandoned.

(51) Int. Cl.
*C04B 22/00*    (2006.01)

(52) U.S. Cl. .................. 106/705; 106/DIG. 1; 106/813

(58) Field of Classification Search ................. 106/705, 106/DIG. 1, 813
See application file for complete search history.

(56) References Cited

U.S. PATENT DOCUMENTS

| | | |
|---|---|---|
| 4,804,297 A | 2/1989 | Reifsnyder et al. |
| 5,352,288 A | 10/1994 | Mallow |
| 5,387,738 A | 2/1995 | Beckham et al. |
| 5,494,513 A | 2/1996 | Fu et al. |
| 5,565,028 A | 10/1996 | Roy et al. |
| 5,601,643 A | 2/1997 | Silverstrim et al. |
| 5,624,489 A | 4/1997 | Fu et al. |
| 5,820,668 A | 10/1998 | Comrie |
| 6,027,561 A | 2/2000 | Gruber et al. |
| 6,036,768 A | 3/2000 | Edlinger et al. |
| 6,342,191 B1 | 1/2002 | Kepner et al. |
| 6,358,311 B1 | 3/2002 | Arai et al. |
| 6,409,819 B1 | 6/2002 | Ko |
| 6,419,738 B1 | 7/2002 | Classen et al. |
| 6,482,258 B2 | 11/2002 | Styron |
| 6,494,951 B1 | 12/2002 | Reddy et al. |
| 6,565,647 B1 | 5/2003 | Day et al. |
| 6,645,289 B2 | 11/2003 | Sobolev et al. |
| 6,749,679 B2 | 6/2004 | Shi |
| 2004/0187740 A1 | 9/2004 | Timmons |

FOREIGN PATENT DOCUMENTS

CN    1115309 C    7/2003
WO    WO 2004/087600    10/2004

OTHER PUBLICATIONS

Dynastone Generation 2 Acid Resistant Concrete Pipe, Corrosion Resistant Economical, Oct. 2, 2004, brochure only.

(Continued)

*Primary Examiner*—Paul Marcantoni
(74) *Attorney, Agent, or Firm*—Paula D. Morris; The Morris Law Firm, P.C.

(57) ABSTRACT

Cementitious compositions comprising pozzolonic materials, alkaline earth metals, and a catalyst to catalyze the reaction between the pozzolonic materials and the alkaline earth metals.

24 Claims, 4 Drawing Sheets

OTHER PUBLICATIONS

Chiara F. Ferraris, Concrete Mixing Methods and Concrete Mixers: State of the Art, National Institute of Standards and Technology, Mar.-Apr. 2001, pp. 391-399, vol. 106, No. 2.

Mario Collepardi, et al., Influence of Amorphous Colloidal Silica on the Properties of Self-Compacting Concretes, Proceedings of the International Conference "Challenges in Concrete Construction—Innovations and Developments in Concrete Materials and Construction" Sep. 2002, pp. 473-483, Dundee, Scotland, UK.

Torftech, Energy & Amorphous Silica Production from Rice Husk, TORBED Process Reactor Technology Application Description, Aug. 2002, http://www.torftech.com/pdf/Application%20Description%20-%20Rice%20Hulls.pdf.

Quikrete (R), Material Safety Data Sheet, Jan. 2002.

Zeoponix, Inc. Zeolite: The Versatile Mineral, 2000, http://www.zeoponix.com/zeolite.htm.

Rugby, How Cement is Made, Mar. 2003, http://www.rmcrugby.co.uk/pages/howcementismade.asp.

New Jersey Institute of Technology (NJIT), NJIT Researchers Patent a Process to Use Fly Ash Waste to Make Stronger Concrete(Ref. #33), Mar. 9, 2000, http://www.njit.edu/v2/News/Releases/33.html.

Kevin Copeland, Fly Ash Properties and Uses, Monolithic Dome Articles, Dec. 2, 2003, http://www.monolithic.com/construction/flyash/.

P.K. Mehta, Role of Flyash in Sustainable Development, BuildingGreen.com, Dec. 8, 1998, http://www.buildinggreen.com/features/flyash.mehta.cfm.

Portland Cement Association, Effects of Substances on Concrete and Guide to Protective Treatments, 2001, pp. 1-36.

Bulletin 1-28, ISG Resources, Feb. 2003.

Percy Harrison, et al., The Cassell Dictionary of Chemistry, A Cassell Book, 1998, UK.

Coal Remining Best Managment Practices Guidance Manual, Office of Water Office of Science and Technology Engineering and analysis Division U.S. Environmental Protection Agency, Dec. 2001, pp. 17 & 23.

Sun, et al., Water Resistant Composite Portland Cement, CN1381417, Nov. 27, 2002, abstract only.

Yamazaki, et al., Soil Solidification Agents for Preventing Liquation of Harmful Materials in Solidification of Sludge, JP2003321676, Nov. 14, 2003, abstract only.

Jin, et al., Manufacture of Water-Permeable Concrete Using Waste Materials, CN1346813, May 1, 2002, abstract only.

Gu, Ultrahigh-Strength Cement Concrete Containing Zeolite, JP2002255621, Sep. 11, 2002, abstract only.

Wu, et al., Inorganic Steel Bar Anchoring Glue for Concrete and Its Production Process, CN1332215, Jan. 23, 2002, abstract only.

Jun, Lightweight Plate Heat and Sound Insulators Prepared from Lightweight Aggregates, Vermiculite, Zeolite, Fly Ash and Cement, KR2000067360, Nov. 15, 2000, abstract only.

Chen, et al., Reinforcing Agents for Multifunction Cement, CN1311171, Sep. 5, 2001, abstract only.

Janotka, et al., Utilization of Natural Zeolite in Portland Pozzolan Cement of Increased Sulfate Resistance, American Concrete Institute SP 2000 SP-92 (Durability of Concrete vol. 1), 2000, pp. 223-232, abstract only.

Paschenko, et al., Blended Cements from Natural Zeolites, Tsement, 1988, 3, pp. 12-13, abstract only.

Han, Pozzolan-Cement Mixes for Exclusive Ready-Mixed Concrete, KR2000007019, Feb. 7, 2000, abstract only.

Kim, Industrial Waste-Based Pozzolan Material and Cheap Cement Admixture Composition Using Anhydrous Gypsum, KR000007099, Feb. 7, 2000, abstract only.

Lee, et al., Manufacture of Waterproof Agent Containing Natural Zeolite for Cement Mixes, KR2000001536, Jan. 15, 2000, abstract only.

Jiang, Treatment of Fly Ash for Cement and Concrete, CN1274693, Nov. 29, 2000, abstract only.

Niepelova, et al., Dry Mix for Production of Suspensions for Special Foundation Engineering and Its Use, SK279524, Dec. 2, 1998, abstract only.

Gomes, Compositions for Unfired Ceramic Products for Civil Construction, BR9606112, Mar. 23, 1999, abstract only.

Zhang, Stabilizing Agent for Cement and Its Manufacture, CN1152557, Jun. 25, 1997, abstract only.

Yamamoto, Building Material Compositions for Making Boards, Panels, or Walls Having Dew Condensation-Preventing Effect, JP11012066, Jan. 19, 1999, abstract only.

Han, et al., Low-Calcium Cement for Glass Fiber Reinforced Cement (GRC) Products, CN1081426, Feb. 2, 1994, abstract only.

Popovici, Cement Mortar Compositon, RO102026, May 14, 1992, abstract only.

Haruna, Cements Containing Blast-Furnance Crushed Slags as Main Component, JP04097934, Mar. 30, 1992, abstract only.

Xia, Ammonium Chloride-Contaiing Cement Stabilizer, CN87102830, Nov. 9, 1988, abstract only.

Kozlova, Mixing Sequence for Strong Binder, SU1392045, Apr. 30, 1988, abstract only.

Dolezsai, et al., Self-Leveled Polished Finihsing Compositions, DE3339197, May 3, 1984, abstract only.

Sumitomo Cement, Mortar or Concrete Composition, JP56120557, Sep. 21, 1981, abstract only.

Royak, et al., Raw-Material Mixture for the Production of Portland Cement Clinker, SU278511, Aug. 5, 1970, abstract only.

Takeshi Yamamoto, A Proposal Convenient Assessing Method for the Preventive Effect of Fly Ash on Alkali-Silica Reaction, Annual Research Report, 2001, pp. 52-53, Central Research Institute of Electric Power Industry, Japan.

Park, Method for Manufacturing Water Purification Concrete Using Industrial By-Product, KR2001069443, Jul. 25, 2001, abstract only.

Sefa Group, What is Fly Ash?: Technical Advantages of Fly Ash in Hardened Concrete, May 2, 2005, http://www.sefagroup.com/flyash_hardened_concrete.htm.

USPTO, First Office Action for U.S. Appl. No. 10/716,241, Aug. 16, 2004.

The Morris Law Firm, P.C., Response to First Office Action for U.S. Appl. No. 10/716,241, Feb. 15, 2005.

USPTO, Final Office Action for U.S. Appl. No. 10/716,241, Apr. 26, 2005.

PCT, International Search Report for Application No. PCT/US04/08823, Oct. 14, 2004.

PCT, Written Opinion for Application No. PCT/US04/08823, Oct. 14, 2004.

The Morris Law Firm, P.C., Article 19 Amendments for Application No. PCT/US04/08823, Dec. 14, 2004.

PCT, International Preliminary Report on Patentability, for Application No. PCT/US04/08823, Oct. 13, 2005.

CEMENTITIOUS COMPOSITION

PRIORITY

The present application is a continuation-in-part of application Ser. No. 10/716,241 (pending). The present application claims the benefit of the filing date of U.S. Provisional Patent Application Ser. No. 60/457,992, filed Mar. 27, 2003, and U.S. Provisional Patent Application Ser. No. 60/508,726, filed Oct. 3, 2003.

FIELD OF THE INVENTION

The present application relates to cementitious compositions.

BACKGROUND OF THE INVENTION

Pozzolans can be used in combination with Portland Cement to produce products of superior strength and chemical resistance. The slow rate of strength gain has limited the practical amount of Portland Cement replacement with pozzolan.

Pozzolan accelerators based on alkali metals have been used to increase the practical amount of Portland Cement replacement with pozzolan. These alkali accelerators maintain a high pH and provide soluble alkali metals required for pozzolonic acceleration. Common accelerators include alkali silicates, carbonates and hydroxides. An unfortunate feature common to alkali-metal based pozzolan accelerators, and other currently available accelerators, is their caustic nature. Caustic accelerators can cause contact burns and present significant safety risks.

Pozzolan accelerators are needed that maintain high levels of Portland Cement replacement while providing a safe, stable alternative to caustic accelerators.

SUMMARY OF THE INVENTION

The present application provides a cementitious composition comprising: pozzolonic material selected from the group consisting of fly ash, calcined or uncalcined volcanic ash, rice hull ash, and combinations thereof; catalyst selected from the group consisting of alkali-containing zeolite, alkali-containing feldspathoid, and combinations thereof; wherein, upon addition of sufficient water and exposure to effective curing conditions, the cementitious composition is effective at a ratio of 0.02 or more catalyst to cementitious composition to produce a cement product having a strength at 24 hours that is greater than the strength of the same cement product made under the same conditions using NaOH as catalyst.

DESCRIPTION OF THE INVENTION

The present invention provides a cementitious composition useful for accelerating the reaction between pozzolonic materials and alkaline earth metals. The cementitious composition includes "pozzolonic material" (defined below), and "zeolite" or "feldspathoid" catalyst (defined below). In addition to accelerating the reaction between the pozzolonic materials and any alkaline earth metals, the zeolite or feldspathoid catalyst (1) allows for higher concentrations of pozzolonic material to replace the alkaline earth metal in the composition, (2) allows for superior rates of strength gain over prior art compositions, and (3) provides a non-caustic alternative to the pozzolan accelerators generally known and used in the art.

All of the above ingredients can be interground or interblended and used as a complete cementitious composition with or without additional admixtures. In addition to the properties already recited, compositions formed in accordance with the present invention are durable, have superior freeze-thaw resistance without the use of air-entraining admixtures, have superior sulfate and sulfuric acid resistance, excellent resistance to abrasion and are more impermeable to moisture and chloride than other concretes and mortars.

In general, the term "cementitious" refers to materials including those typically required to make cement. Generally speaking, cementitious materials are binder materials that harden to form a connecting medium between solids. Cementitious materials include cements, which may include any mixture of finely-ground lime, alumina, and silica that will set to a hard product that combines with other ingredients to form hydrates, including but not necessarily limited to Portland Cement, hydraulic cements, blended cement, and masonry cement, mortar, and related aggregate, admixtures and/or additives including hydrated lime, limestone, chalk, calcareous shell, talc, slag or clay. In a preferred embodiment, the term "cementitious" refers to the total amount of pozzolonic material and catalyst plus any alkaline earth metal(s).

Pozzolonic Material

The cementitious composition comprises pozzolonic material. Pozzolonic materials are inorganic materials, either naturally occurring or industrial by-products typically comprising siliceous compounds or siliceous and aluminous compounds. Examples of suitable pozzolonic materials include, but are not necessarily limited to one or a combination of commercially available pozzolans including coal fly ash, silica fume, diatomaceous earth, calcined or uncalcined diatomite, calcined fullers earth, pozzolonic clays, calcined or uncalcined volcanic ash, bagasse ash, rice hull ash, natural and synthetic zeolites, metakaolin, slag and other sources of amorphous silica. Preferred pozzolonic materials are selected from the group consisting of fly ash, calcined or uncalcined volcanic ash, rice hull ash, and combinations thereof. Examples of suitable fly ash include, but are not necessarily limited to, Class F, Class C or Class N as defined in ASTM C-618, "Specification for Coal Fly ash and Raw or Calcined Natural Pozzolan for Use as a Mineral Admixture in Portland Cement Concrete." Preferred pozzolonic materials may be obtained from the following commercial sources: Boral Material Technologies; ISG, and LaFarge.

All of the alkaline earth metal (preferably calcium-containing material) may be replaced by the pozzolonic material, however, effective curing conditions for cementitious compositions that do not include calcium-containing material generally include higher temperatures, typically autoclaving at about 80° C. In one embodiment, the cementitious composition is composed of up to about 95% by weight pozzolonic material, suitably from about 10% to 95% by weight pozzolonic material, preferably from about 40% to about 95% by weight pozzolonic material. In a preferred embodiment, the pozzolonic material makes up approximately 80% or more by weight, based on the total weight of the cementitious composition. Preferably, the cementitious composition comprises from about 80% to about 95% by weight, more preferably from about 80 wt. % to about 90 wt. % of the cementitious composition, based on the total weight of the cementitious composition. Suitable pozzolonic materials comprise from about 10% to about 50% by weight amorphous silica or vitreous silica (hereafter "silica"), preferably from about 20% to about 40% by weight silica, even more preferably about 35% silica.

Catalyst

The cementitious composition also comprises catalyst. Suitable catalysts are pozzolan accelerators. Examples of suitable catalysts include, but are not necessarily limited to "alkali exchanging aluminosilicates." In a preferred embodiment, the catalysts include alkali-containing zeolites comprising one or more alkali metal(s) and alkali-containing feldspathoids comprising one or more alkali metal(s) that preferably function as the source of alkali necessary to catalyze the reaction between the pozzolonic material and alkaline earth metal (i.e., react pozzolonically with calcium to release the alkali).

Zeolites are crystalline, hydrated aluminosilicates. Suitable zeolites may be either naturally-occurring or synthetic in origin. Preferred naturally-occurring zeolites include, but are not necessarily limited to one or a mixture of analcime, chabazite, gmelinite, mordenite, natrolite, faujasite, phillipsite, sodalite, nepheline, scapolite, cancrinite, erionite and clinoptilolite. Preferred synthetic zeolites include, but are not necessarily limited to one or a mixture of a Class A, Class X, SYNTHETIC CLINOPTILOLITE, Class B, Class F, Class K-F, Class G, Class P-B, Class P-C, Class Z, Class ZK-19, Class ZSM-2 and Class ZSM-3, most preferably Class A zeolites.

Feldspathoids are similar in chemical composition and structure to zeolites and have open cavities within the aluminosilicate structure capable of containing alkali metals. As such, feldspathoids are similar to zeolites in that they are pozzolonic and have exchangeable alkali ions. Preferred examples of feldspathoids include, but are not necessarily limited to nepheline ($NaAlSiO_4$ with a little potassium) and leucite ($KAlSi_2O_6$). Preferred catalysts may be obtained from the following commercial sources: PQ Corporation; and Zeolyst International.

Compositionally, zeolites are similar to clay minerals. Zeolites differ, however, in their crystalline structure. Whereas many clays have a layered crystalline structure (similar to a deck of cards) and are subject to shrinking and swelling as water is absorbed and removed between the layers, zeolites have a rigid, 3-dimensional crystalline structure (similar to a honeycomb) consisting of a network of interconnected tunnels and cages. Water moves freely in and out of these pores but the zeolite framework remains rigid. Another special aspect of this structure is that the pore and channel sizes are nearly uniform, allowing the crystal to act as a molecular sieve. The porous zeolite is host to water molecules and ions of potassium and calcium, as well as a variety of other positively charged ions, but only those of appropriate molecular size to fit into the pores are admitted creating the "sieving" property. Zeolites of a preferred embodiment contain sodium ions.

In the presence of moisture, pozzolonic materials react with alkaline earth metal, preferably calcium-containing material, most preferably calcium hydroxide, to form compounds possessing cementitious properties. Examples of compounds possessing cementitious properties include calcium silicate hydrates, calcium aluminate hydrates and calcium silicoaluminate hydrates. In a preferred embodiment, the amount of zeolite or feldspathoid in the composition is not substantial enough to be responsible for the accelerating effect by itself without additional pozzolan. In a preferred embodiment, the zeolite or feldspathoid catalyzes the pozzolonic reaction between calcium-containing material (Portland Cement, for example) and the pozzolonic material (fly ash, for example). "Pozzolanic activity," refers to the ability of the silica and alumina components of fly ash and the like to react with available calcium and/or magnesium, preferably from the hydration products of Portland Cement.

ASTM C618 requires that the pozzolanic activity index with Portland Cement, as determined in accordance with ASTM C311, be a minimum of 75 percent of the average 28-day compressive strength of control mixes made with Portland Cement. The optimum amount of zeolite or feldspathoid necessary to catalyze the reaction is dependent upon the reactive nature of the pozzolonic material and can be determined by producing test articles containing varying amounts of the zeolite or feldspathoid. For example, when a Class F fly ash is used as a pozzolonic material, it is preferred to use from about 0.1% to about 10% by weight zeolite in the cementitious composition, preferably from about 2% to about 4% by weight zeolite in the cementitious composition for optimum results. When a Class C fly ash is used as a pozzolonic material, it is preferred to use from about 0.1% to about 10% by weight zeolite in the cementitious composition, preferably from about 0.5% to about 1.5% by weight zeolite in the cementitious composition. Where less rapid setting is desired, the percentage of catalyst can be reduced. Where more rapid setting is desired, the percentage of catalyst can be increased. In a preferred embodiment, upon addition of sufficient water and exposure to effective curing conditions, the cementitious composition is effective at a ratio of 0.02 or more catalyst to cementitious composition to produce a cement product having a strength at 24 hours that is greater than the strength of the same cement product made under the same conditions using NaOH as catalyst Preferred zeolites or feldspathoids comprise particles having an average diameter of from about 0.1 microns to about 10 microns, preferably from about 2 microns to about 7 microns, most preferably about 5 microns. The average diameter can be obtained by grinding or pulverizing larger particles or by separating means. In a preferred embodiment, the zeolites or feldspathoids comprise pores having an average diameter of from about 2 Å to about 8 Å, preferably from about 3 Å to about 5 Å, most preferably about 4.2 Å.

Alkaline Earth Metal

In a preferred embodiment, the cementitious composition comprises an alkaline earth metal. Suitable alkaline earth metals include but are not necessarily limited to: calcium, magnesium, beryllium, strontium, and barium. Preferred alkaline earth metals are calcium and magnesium. In a preferred embodiment, the cementitious composition comprises "calcium-containing material" including, but not necessarily limited to materials comprising compound(s) selected from the group consisting of CaO and $Ca(OH)_2$ effective to react with the pozzolonic material. Examples of suitable calcium-containing materials include, but are not necessarily limited to one or a mixture of Portland Cement, calcium aluminate cement, calcium sulfoaluminate cement, hydrated lime, quicklime and lime kiln dust. In a preferred embodiment, Portland Cement including all types of Portland Cement (I-V and IA-IIIA) as referenced in ASTM C 150-95 may be used.

Of course, the particular calcium-containing material used will depend, in the poorest areas of the world, on the most readily available, inexpensive option. Preferred calcium-containing materials may be obtained from the following commercial sources: Texas Industries, Inc.; California Portland Cement Co.; and North Texas Cement Company; Cemex; and Alamo Cement.

Portland Cement is essentially a mixture of hydraulic calcium silicates and calcium aluminum silicates contained in a crystalline mass. Major compounds include tricalcium silicate, dicalcium silicate, tricalcium aluminate, tetracalcium aluminoferrite, calcium sulfate dihydrate (Gypsum).

Water, of course, is mixed with the composition in the amount required to process the composition for the use sought (i.e. workable consistency), after the dry ingredients discussed above have all been thoroughly admixed. The amount of water used in the composition depends on the ultimate use of the composition (i.e., floor or wall, or building products such as cinder block, etc.). The particular amount of water necessary for any given composition may be determined by routine experimentation.

In addition to the main components, other components may be added for particular purposes. For example, expanded fillers can be added to form lightweight cinder blocks and tile. Examples of expanded fillers include, but are not necessarily limited to hollow glass cenospheres, glass or polymer microspheres, vermiculite, expanded pearlite, expanded polystyrene, expanded shale or clay, or synthetic lightweight aggregate. The amount of expanded filler added can vary widely depending upon the density and strength desired in the final product.

The use of additional components may also be employed to (1) further accelerate the very early strength (1 to 3-day strength) of the cementitious composition, (2) reduce the water requirements (using a water-reducing component), and (3) modify the viscosity (i.e., viscoelastic properties) of the cementitious composition (using a viscosity modifier). Each of these components may be added to a particular composition in an amount sufficient to produce acceptable qualities for a particular application.

Typical early strength enhancers include, but are not necessarily limited to calcium salts such as calcium chloride, calcium nitrate, calcium lactate, calcium formate and calcium bromide. Other non-calcium early strength enhancers include, but are not necessarily limited to thiosulfates, thiocyanates, amines (especially triethanolamine), glyoxal, urea, formaldehyde and aluminates such as sodium aluminate or aluminum trihydroxide.

Herein, a water-reducing component refers to a chemical admixture that allows for the production of a cementitious composition at a given workable consistency while using less water. The amount of water-reducing component used will vary depending upon the particular cementitious composition. A preferred amount of water-reducing component is an amount necessary to decrease the water requirement of the admixture by about 10% or more, while still achieving a workable consistency of the cementitious composition. For example, the test indicated in Example 6 shows the effect upon viscosity of the cementitious composition (i.e., cement paste) using a water-reducing component/fly ash ratio in amounts ranging from 0.005 to 0.025. By inspection, the water requirement of the cement compositions using the water-reducing component decreased by about 20%. Water-reducing components include, but are not necessarily limited to calcium or alkali salts of sulfonated lignin (such as DARACEM-19® and DARACEM-100®) hydroxylated polymers and copolymers, salts of hydroxy carboxylic acids (especially sodium citrate and sodium gluconate), salts of condensation polymers of melamine urea and melamine formaldehyde, salts of condensation polymers of sulfonated naphthalene formaldehyde (such as BOREM B-600 CNL, BOREM 100-HNL, BOREM 100-HSP), formaldehyde/urea polymers, carboxylated polyethers (such as ADVA FLOW®), preferably sulfonated condensation copolymers of formaldehyde and ketones.

When using high-range water-reducing admixtures, segregation is often encountered. Viscosity modifiers are added to reduce, preferably to prevent segregation. Herein segregation is defined as the settlement of aggregate from the viscoelastic paste due to viscosity thinning of the paste. Modifications to the viscoelastic properties are accomplished using viscosity modifying admixtures, also referred to as viscosity enhancing agents. Suitable viscosity modifiers include, but are not necessarily limited to hydroxyethyl cellulose, guar gum, carageenan gum, various clays, salts of acrylic acid and acrylic acid copolymers, acrylamide polymers and copolymers of acrylamide. In addition, all of the above mentioned ingredients, including water-reducing components alone, or in combination with viscosity modifiers, may further be used in the manufacture of self consolidating concrete (SCC).

The cementitious composition reacts and sets rapidly to produce a product cement. The compression strength of the product cement is comparable to the compression strength of other cements. Without limiting the invention to a particular mechanism of action, it is believed that zeolites and feldspathoids accelerate the pozzolonic reaction by serving as the source of alkali.

Depending on the type and amount of catalyst used, the pH of the pozzolonic reaction is from about 10 to about 14, preferably from about 11 to about 14, most preferably about 12. Another factor used to determine the amount of catalyst used in a given cementitious composition is the desire to control or prevent efflorescence, the amount of air-entraining agents used, and the amount of the chemical and solid components used.

When mixed with water, the cementitious composition is easily extruded, compression molded, or cast into simple or complex shapes. At 24-hours, the cementitious composition achieves strengths of 2000 or more, preferably more than 2000 psi, most preferably 3000 psi or more. Suitable compression strengths are achieved in about 3 days to about 56 days, preferably in about 7 days to about 28 days, most preferably in about 28 days. The higher the temperature and the relative humidity, the more rapid the attainment of higher compressive strengths. It is preferred during manufacture to operate at the highest temperature practical, up to about 130° F., depending on the location of operation.

Figure 1:
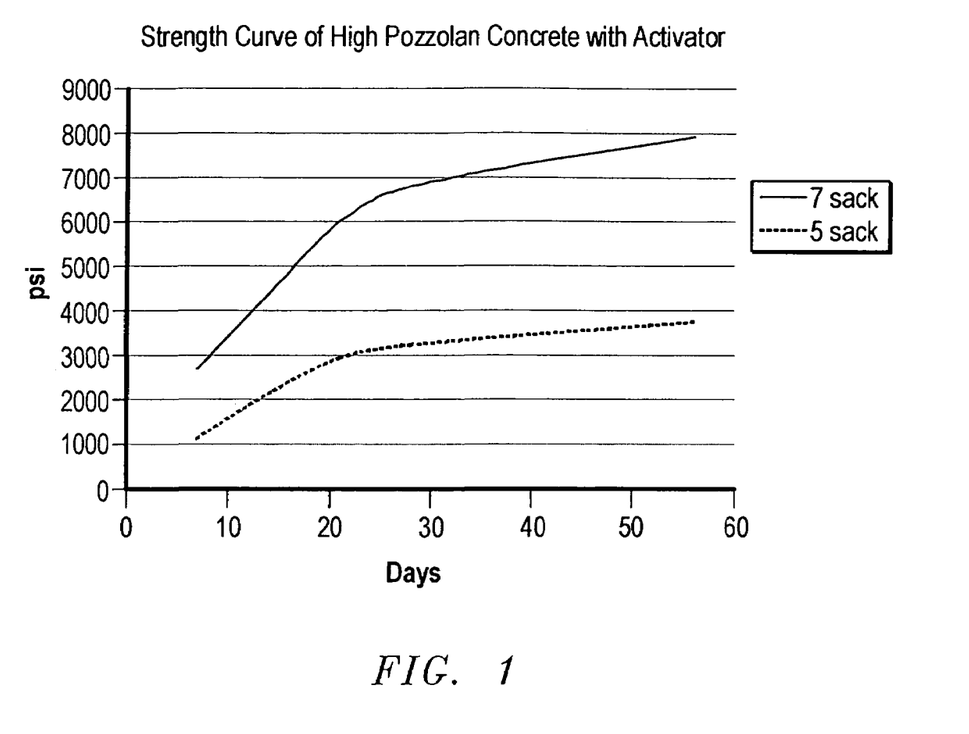
FIG. 1 depicts the strength curve of high pozzolan concrete with catalyst.

Typical strength curves for 7 and 5 sack mixes of the present composition are shown in FIG. 1. The term "sack" refers to the number of cubic feet of cementitious material used. As can be seen, strengths approaching 7000 psi are possible in 28 days in a recipe containing 7 cu ft. of cement per yard of concrete. As demonstrated, 7 cu ft. of cement weighs 490 lbs and contains 389 lbs of Class C fly ash and 95 lb of Class I Portland Cement. The strength curve is obtained without the use of water reducing admixtures or any other admixtures except zeolite or feldspathoid. The strength of similar recipes without the catalyst can be up to about 80% less strong at 28 days as the recipes that contain them. In other words, the strength of the cement product at 28 days is greater than the strength of the same cement product in the absence of said catalysts selected from the group consisting of zeolite, feldspathoid, and a combination thereof.

All components of the cementitious composition can be mixed using either a batch mixer or a continuous mixer (i.e., mobile truck mixer). Proper mixing considerations include for instance: location of the construction site (distance to a ready-mix plant), the amount of product needed, the construction schedule (volume of product needed per hour), the cost of the mixing method, and the quality of the mixture desired (i.e. distributing all the components uniformly).

The invention will be better understood with reference to the following examples, which are illustrative only and not intended to limit the present invention to a particular embodiment.

EXAMPLE 1

High Strength F Ash/Concrete Block Fill/Mortar Recipe

| Material | Amount |
| --- | --- |
| Class C-33 concrete Sand | 735 g. |
| Class I Portland Cement | 60 g. |
| Class F Fly Ash (Limestone Plant) | 200 g. |
| Valfor 100 Zeolite | 7 g. |
| Lime | 3 g. |
| B-100 Water Reducer | 1.5 g. |
| Water | 75.5 mL |

All dry ingredients were dry mixed before water was added. The water was added and the mixture was molded into 2"×2" cubes. The mixture was a free flowing, self-leveling material and required minimal finishing. The strength at 24 hours was 776 psi, the 9-day strength was 3983 psi. and the strength at 29 days was 5465 psi.

EXAMPLE 2

High Strength C Ash/Concrete Recipe

| Material | Amount |
| --- | --- |
| Class C Fly Ash (Parish, TX Plant) | 430 lbs |
| Class I Portland Cement | 115 lbs |
| Class C-33 silica Sand | 1620 lbs |
| 1.5" crushed limestone aggregate | 1700 lbs |
| ADVERA 401 Zeolite | 14.7 lbs |
| Water | 200 lbs (estimate) |

The solid ingredients were mixed using a mobile mix concrete truck. The fly ash (700 lb.), cement (188 lb.) and zeolite (24 lb) were dry mixed using a portable mortar mixer and then transferred to the cement silo of the mobile mix truck. The truck was calibrated to deliver 8 cubic feet of the above cement mixture (density of 70 lb/cu ft.), 1620 lb of sand and 1700 lb of rock per yard of concrete produced and sufficient water to produce a 3" slump (estimated at 200 lb). The concrete thus produced exhibited strengths of 4360 psi at 14 days, 6020 psi at 21 days, 6810 psi at 28 days and 7933 psi at 56 days. No water reducers or additional admixtures were used.

EXAMPLE 3

Normal Strength C-Ash/Concrete Recipe

| Material | Amount |
| --- | --- |
| Class C Fly Ash (Parish, TX Plant) | 284 lbs |
| Class I Portland Cement | 69 lbs |
| Class C-33 silica Sand | 1830 lbs |
| 1.5" crushed limestone aggregate | 1700 lbs |
| ADVERA 401 Zeolite | 3.75 lbs |
| Water | 125 lbs (estimate) |

The solid ingredients were mixed using a mobile mix concrete truck. The fly ash (910 lb.), cement (220 lb.) and zeolite (12 lb) were dry mixed using a portable mortar mixer and then transferred to the cement silo of the mobile mix truck. Less catalyst was used to prevent the occurrence of efflorescence. The truck was calibrated to deliver 5 cubic feet of the above cement mixture (density of 70 lb/cu ft.), 1830 lb of sand and 1700 lb of rock per yard of concrete produced and sufficient water to produce a 3" slump (estimated at 125 lb). The concrete thus produced exhibited strengths of 1130 psi at 7 days, 2130 psi at 14 days and 3230 psi at 28 days. No additional admixtures or water reducers were used.

EXAMPLE 4

Shotcrete Recipe

| Material | Amount |
| --- | --- |
| Class C Fly Ash (Parish, TX Plant) | 426 lbs |
| Type I Portland Cement | 103 lbs |
| Silica Sand | 2280 lbs |
| ⅜" gravel | 1520 lbs |
| ADVERA 401 Zeolite | 5.63 lbs |
| Water | 190 lbs (estimate) |

The solid ingredients were mixed using a mobile mix concrete truck. The fly ash (910 lb.), cement (220 lb.) and zeolite (12 lb) were dry mixed using a portable mortar mixer and then transferred to the cement silo of the mobile mix truck. Less catalyst was used to prevent the occurrence of efflorescence. The truck was calibrated to deliver 7.5 cubic feet of the above cement mixture (density of 70 lb/cu ft.), 2280 lb of sand and 1520 lb of pea gravel per yard of concrete produced and sufficient water to produce a 1" to 2" slump (estimated at 190 lb). The concrete thus produced exhibited strengths of 980 psi at 4 days and 4760 psi at 28 days. No additional admixtures or water reducers were used.

EXAMPLE 5

Acid Resistant Concrete Recipe

| Material | Amount |
| --- | --- |
| Class F Fly Ash (Martin Lake, TX Plant) | 988 grams |

-continued

| Material | Amount |
|---|---|
| Type I Portland Cement | 156 grams |
| Silica Sand | 2280 grams |
| 3/8" gravel | 1924 grams |
| ADVERA 401 Zeolite | 24.36 grams |
| Sulfonated Copolymer of Formaldehyde and Ketone | 12.1 grams |
| Water | 141 grams |

The solid ingredients were combined in a mixer. Once mixed, water was added and the ingredients were further mixed for 90 seconds and then packed into several 3"×6" plastic molds. Each molded article was cured at 130° F. for 15 hours, then removed from the mold. The strength of the material at 24 hours was 3,490 psi. The strength of the material at 28 days it was 6,090 psi.

EXAMPLE 6

Figure 2:
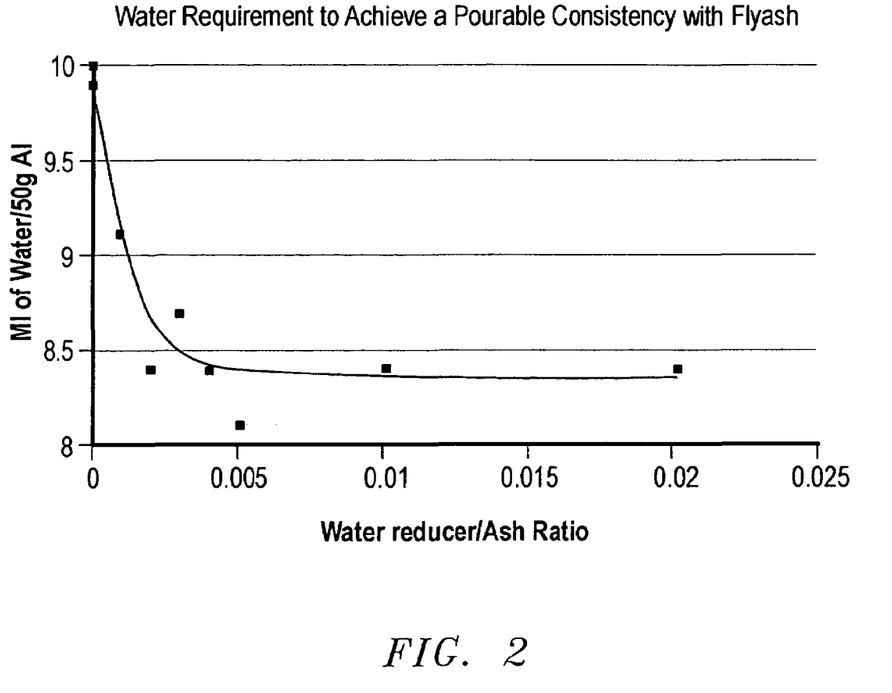
FIG. 2 depicts the effects of the water-reducing component in Example 6, on the water requirements necessary to achieve a flowable consistency with fly ash.
Figure 3:
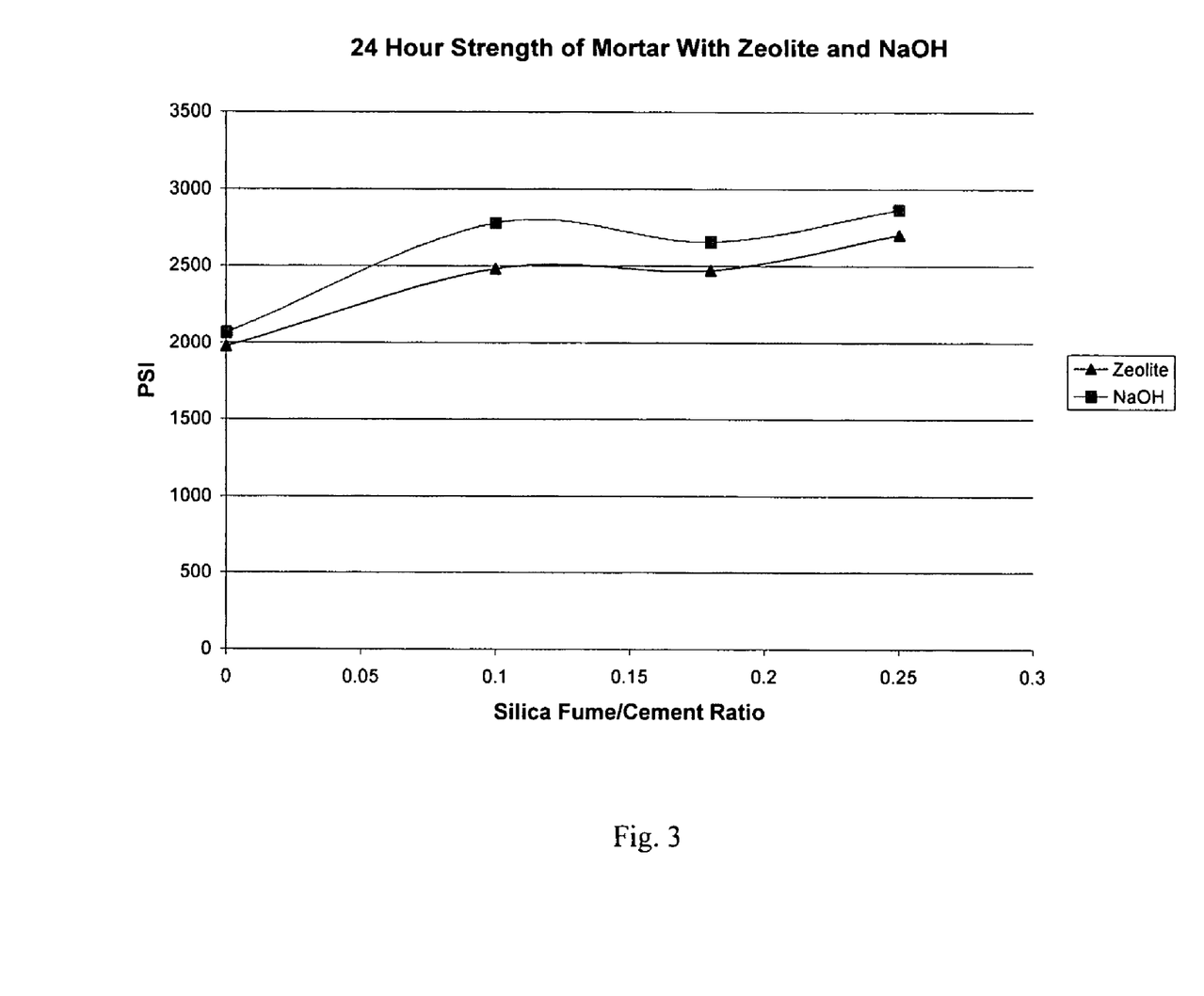
FIG. 3 is a chart of 24-hour strength of the mortar cubes of Example 7 with zeolite and NaOH at varying amounts of silica fume.

To determine the optimum levels of water-reducing component, the following test was performed. 50 g of fly ash and varying amounts of sulfonated formaldehyde and ketone (water-reducing component) were mixed together and a sufficient amount of water was added to each mixture to achieve flowable consistency. FIG. 2 depicts the effects of the water-reducing component on the water requirements necessary to achieve a flowable consistency with fly ash.

EXAMPLE 7

This example demonstrates the similarity of zeolite and sodium hydroxide activators in mortar formulas containing varying levels silica fume with fly ash.

| Ingredient | Amount (grams) (Zeolite activator) | Amount (grams) (Sodium Hydroxide activator) |
|---|---|---|
| Fly ash | 200 | 200 |
| Silica Fume | 0-12.5 | 0-12.5 |
| Ordinary Portland Cement | 50 | 50 |
| Graded Sand | 750 | 750 |
| Water Reducer | 2.5 | 2.5 |
| Zeolite | 5 | 0 |
| Sodium Hydroxide | 0 | 1 |
| Water | 61-64 | 60-63 |

Figure 4:
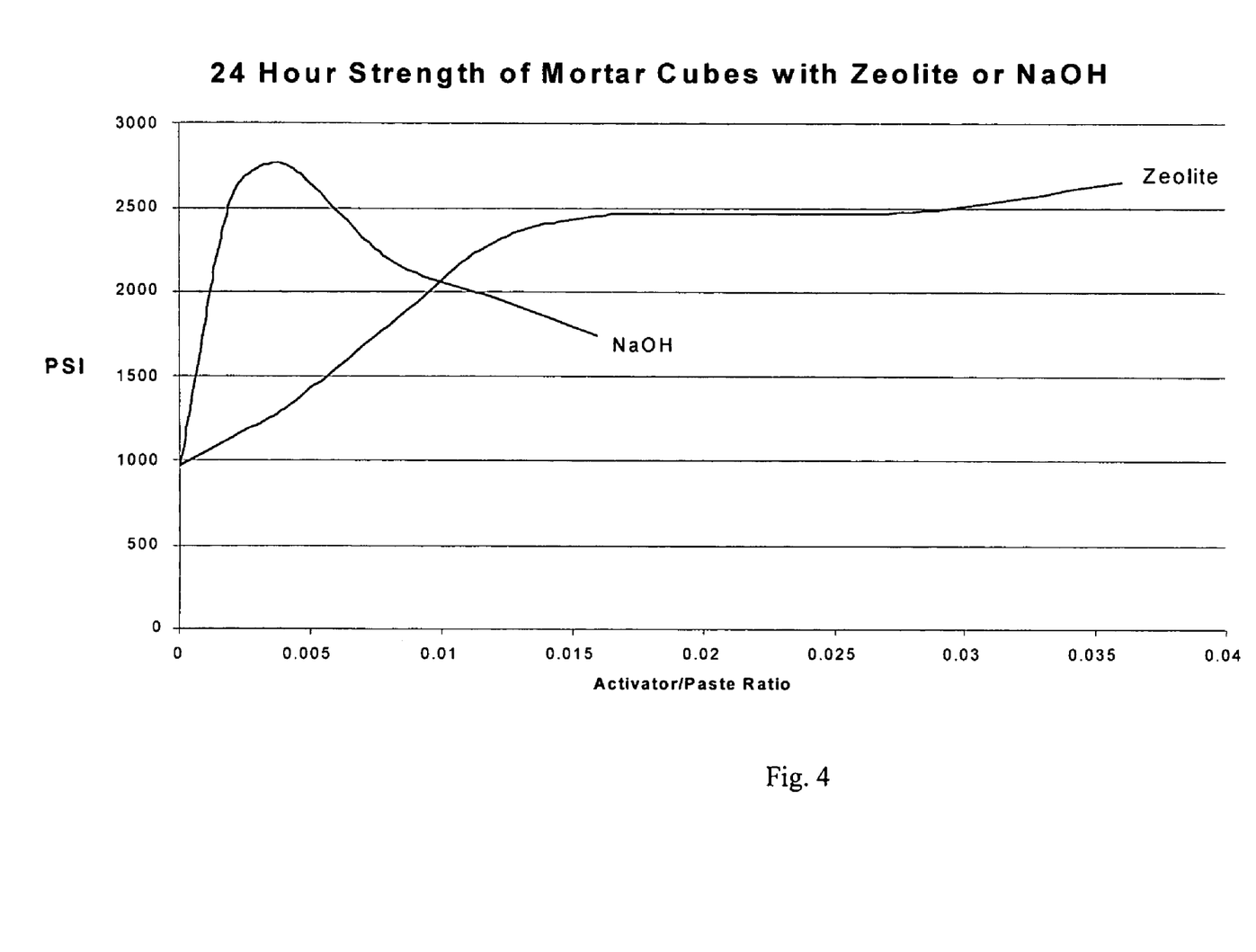
FIG. 4 is a chart of 24-hour strength of the mortar cubes of Example 8 with varying amounts of zeolite or NaOH

The above materials were mixed for 90 seconds in a mixer, packed into 2"×2" cube molds and allowed to stand at room temperature for 5 to 7 hours. After sitting at room temperature, the samples were cured for 15 hours at 54.4° C., demolded and placed in a moist cabinet until compression testing. Compression testing was performed at 24 hours. The results are presented in the following table and in FIG. 4.

| Silica Fume/ Cement Ratio | Compressive Strength (psi) | |
|---|---|---|
| | Zeolite | Sodium Hydroxide |
| 0.00 | 1977 | 2067 |
| 0.10 | 2482 | 2779 |
| 0.18 | 2472 | 2656 |
| 0.25 | 2703 | 2868 |

EXAMPLE 8

The procedures of Example 7 were repeated using varying amounts of sodium hydroxide and zeolite and the 24 hour strength was compared.

| Ingredient | Amount (grams) (Zeolite activator) | Amount (grams) (Sodium Hydroxide activator) |
|---|---|---|
| Fly ash | 200 | 200 |
| Ordinary Portland Cement | 50 | 50 |
| Graded Sand | 750 | 750 |
| Water Reducer | 2.5 | 2.5 |
| Zeolite | 0-9 | 0 |
| Sodium Hydroxide | 0 | 0.5-4 |

| Activator/Cement + Ash Ratio | 24 - Hour Compressive Strength (psi) | |
|---|---|---|
| | Zeolite | Sodium Hydroxide |
| 0 | 973 | 973 |
| 0.002 | — | 2566 |
| 0.004 | 1310 | 2761 |
| 0.008 | — | 2191 |
| 0.012 | 2292 | — |
| 0.016 | — | 1737 |
| 0.020 | 2468 | — |
| 0.028 | 2476 | — |
| 0.036 | 2657 | — |

Persons of ordinary skill in the art will recognize that many modifications may be made without departing from the spirit and scope of the invention defined by the claims. The embodiment(s) described herein are meant to be illustrative only and should not be taken as limiting the invention, which is defined in the claims.

I claim:
1. A cementitious composition comprising:
   pozzolonic material selected from the group consisting of fly ash, calcined or uncalcined volcanic ash, rice hull ash, and combinations thereof;
   catalyst selected from the group consisting of alkali-containing zeolite, alkali-containing feldspathoid, and combinations thereof;
   where, upon addition of sufficient water and exposure to effective curing conditions, the cementitious composition is effective at a ratio of 0.02 or more catalyst to cementitious composition to produce a cement product having a strength at 24 hours that is greater than the strength of the same cement product made under the same conditions using NaOH as catalyst.
2. The cementitious composition of claim 1 further comprising calcium containing material comprising compound(s) selected from the group consisting of CaO and $Ca(OH)_2$, and combinations thereof, the catalyst being adapted to catalyze pozzolonic reaction between the calcium containing material and the pozzolonic material.
3. The cementitious composition of claim 1 wherein said catalyst is zeolite.
4. The cementitious composition of claim 2 wherein the calcium-containing material is Portland cement.

5. A cementitious composition comprising:

fly ash;

catalyst selected from the group consisting of alkali-containing zeolite, alkali-containing feldspathoid, and combinations thereof;

where, upon addition of sufficient water and exposure to effective curing conditions, the cementitious composition is effective at a ratio of 0.02 or more catalyst to cementitious composition to produce a cement product having a strength at 24 hours that is greater than the strength of the same cement product made under the same conditions using NaOH as catalyst.

6. The cementitious composition of claim 5 further comprising calcium containing material comprising compound(s) selected from the group consisting of CaO and Ca(OH)$_2$, and combinations thereof, the catalyst being adapted to catalyze pozzolonic reaction between the calcium containing material and the pozzolonic material.

7. The cementitious composition of claim 6 wherein said catalyst is zeolite.

8. The cementitious composition of claim 7 wherein the calcium-containing material is Portland cement.

9. The cementitious composition of claim 8 further comprising water-reducing component comprising sulfonated condensation copolymers of formaldehyde and ketones.

10. The cementitious composition of claim 9 further comprising viscosity modifier effective to reduce segregation; and, an expanded filler selected from the group consisting essentially of hollow glass cenospheres, glass or polymer microspheres, vermiculite, expanded pearlite, expanded polystyrene, expanded shale or clay, synthetic lightweight aggregate, and combinations thereof.

11. A cementitious composition comprising:

Class F fly ash;

calcium containing material comprising compound(s) selected from the group consisting of CaO and Ca(OH)$_2$, and combinations thereof; and catalyst selected from the group consisting of alkali-containing zeolite, alkali-containing feldspathoid, and combinations thereof, the catalyst being adapted to catalyze the pozzolonic reaction between the calcium containing material and the pozzolonic material;

where, upon addition of sufficient water and exposure to effective curing conditions, the cementitious composition is effective at a ratio of 0.02 or more catalyst to cementitious composition to produce a cement product having a strength at 24 hours that is greater than the strength of the same cement product made under the same conditions using NaOH as catalyst.

12. The cementitious composition of claim 11 wherein the calcium-containing material is Portland cement.

13. The cementitious composition of claim 12 wherein said catalyst is zeolite.

14. The cementitious composition of claim 13 wherein the catalyst is Class A zeolite.

15. The cementitious composition of claim 14 further comprising:

amorphous silica; and, an expanded filler selected from the group consisting essentially of hollow glass cenospheres, glass or polymer microspheres, vermiculite, expanded pearlite, expanded polystyrene, expanded shale or clay, synthetic lightweight aggregate, and combinations thereof.

16. The cementitious composition of claim 15 further comprising water-reducing component comprising sulfonated condensation copolymers of formaldehyde and ketones.

17. The cementitious composition of claim 13 further comprising viscosity modifier effective to reduce segregation.

18. The cementitious composition of claim 17 having a 24-hour strength of 2000 psi or more.

19. The cementitious composition of claim 18 wherein the viscosity modifier is selected from the group consisting of hydroxyethyl cellulose, guar gum, carageenan gum, various clays, salts of acrylic acid and acrylic acid copolymers, acrylamide polymers and copolymers of acrylamide.

20. A cementitious composition comprising:

from about 80 wt. % to about 95 wt. % fly ash, based on the total weight of the cementitious composition;

Portland cement; and one or more catalyst selected from the group consisting of an alkali-containing zeolite, an alkali-containing feldspathoid, and combinations thereof, the one or more catalyst providing sufficient alkali metal to catalyze the pozzolonic reaction between the Portland cement and the fly ash;

where, upon addition of sufficient water and exposure to effective curing conditions, the cementitious composition is effective at a ratio of 0.02 or more catalyst to cementitious composition to produce a cement product having a strength at 24 hours that is greater than the strength of the same cement product made under the same conditions using NaOH as catalyst.

21. The cementitious composition of claim 20 wherein the fly ash is Class F fly ash.

22. The cementitious composition of claim 21 comprising 90 wt. % or less fly ash.

23. The cementitious composition of claim 22 wherein said catalyst comprises from about 0.5% to about 1.5% by weight zeolite comprising particles having an average diameter of from about 2 microns to about 7 microns.

24. The cementitious composition of claim 23 wherein:

said zeolite comprises pores having an average diameter of from about 2 Å to about 8 Å and the zeolite is a naturally-occurring zeolite selected from the group consisting of analcime, chabazite, gmelinite, mordenite, natrolite, faujasite, phillipsite, sodalite, nepheline, scapolite, cancrinite, crionite, clinoptilolite, and combinations thereof:

the cementitious composition further comprising:

an expanded filler selected from the group consisting of hollow glass cenoshperes, glass or polymer microspheres, vermiculite, expanded pearlite, expanded polystyrene, expanded shale or clay, synthetic lightweight aggregate, and combinations thereof;

water-reducing component comprises sulfonated condensation copolymers of formaldehyde and ketones; and, a viscosity modifier effective to reduce segregation.

* * * * *